United States Patent
Kim et al.

(10) Patent No.: US 7,883,794 B2
(45) Date of Patent: Feb. 8, 2011

(54) ELECTROCHEMICAL DEVICE COMPRISING ALIPHATIC MONO-NITRILE COMPOUND

(75) Inventors: Young Soo Kim, Daejeon (KR); Soon Ho Ahn, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/842,075

(22) Filed: Jul. 23, 2010

(65) Prior Publication Data

US 2010/0293779 A1    Nov. 25, 2010

Related U.S. Application Data

(62) Division of application No. 11/343,178, filed on Jan. 30, 2006.

(30) Foreign Application Priority Data

Feb. 2, 2005    (KR) .................. 10-2005-0009706

(51) Int. Cl.
*H01M 6/04*    (2006.01)
*H01M 10/12*    (2006.01)

(52) U.S. Cl. ..................... 429/126; 429/188

(58) Field of Classification Search .............. 429/126
See application file for complete search history.

(56) References Cited

U.S. PATENT DOCUMENTS

| | | | |
|---|---|---|---|
| 4,544,615 A | 10/1985 | Shishikura et al. | |
| 5,326,658 A | 7/1994 | Takahashi et al. | |
| 5,496,656 A | 3/1996 | Inamasu et al. | |
| 5,693,433 A | 12/1997 | Zhukovskiy et al. | |
| 5,750,282 A * | 5/1998 | Chi et al. | 429/49 |
| 6,535,373 B1 | 3/2003 | Smith et al. | |
| 2004/0013946 A1 * | 1/2004 | Abe et al. | 429/326 |
| 2004/0076887 A1 | 4/2004 | Panitz et al. | |

FOREIGN PATENT DOCUMENTS

| | | |
|---|---|---|
| EP | 0694935 A1 | 1/1996 |
| JP | 60003862 A1 | 1/1985 |
| JP | 62082648 A | 4/1987 |
| JP | 2000260428 A | 9/2000 |
| JP | 2002237304 A | 8/2002 |
| JP | 2002302649 A | 10/2002 |
| KR | 20000002115 A1 | 1/2000 |
| KR | 20050089246 A1 | 9/2005 |
| RU | 2143768 C1 | 12/1999 |
| SU | 1006543 A1 | 3/1983 |
| TW | 301069 A4 | 3/1997 |
| TW | 521450 A4 | 2/2003 |
| WO | 9735332 A1 | 9/1997 |
| WO | 2005069423 A1 | 7/2005 |

OTHER PUBLICATIONS

European Search Report for EP 05726460.8 dated Feb. 11, 2009.
International Search Report for PCT/KR2006/000344 dated Feb. 1, 2006.
Non-Final Office Action for U.S. Appl. No. 11/056,290 dated Dec. 1, 2008.
Non-Final Office Action for U.S. Appl. No. 11/056,290 dated Jan. 8, 2010.
Final Office Action for U.S. Appl. No. 11/056,290 dated Jul. 23, 2009.

* cited by examiner

*Primary Examiner*—Dah-Wei D Yuan
*Assistant Examiner*—Jacob Marks
(74) *Attorney, Agent, or Firm*—Cantor Colburn LLP

(57) ABSTRACT

Disclosed is a cathode comprising a complex formed between the surface of a cathode active material and an aliphatic mono-nitrile compound, and an electrochemical device comprising the cathode. A non-aqueous electrolyte containing a lithium salt, a solvent and an aliphatic mono-nitrile compound, and an electrochemical device comprising the electrolyte are also disclosed. The electrochemical device shows excellent low-temperature characteristics, high-temperature life characteristics and safety.

12 Claims, 8 Drawing Sheets

GRAPH OBTAINED BY PERFORMING DISCHARGE CYCLE AT 0.2C EVERY 25 CYCLES

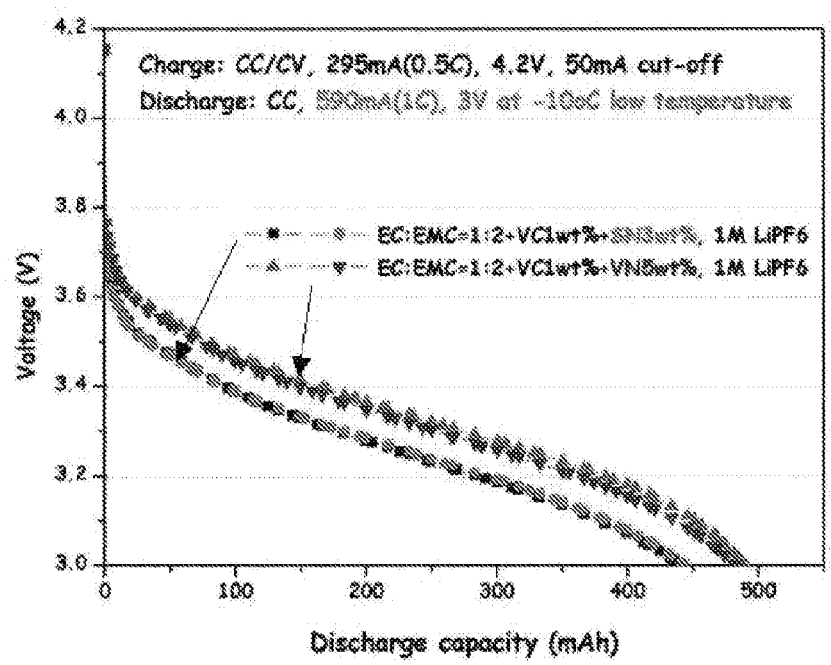

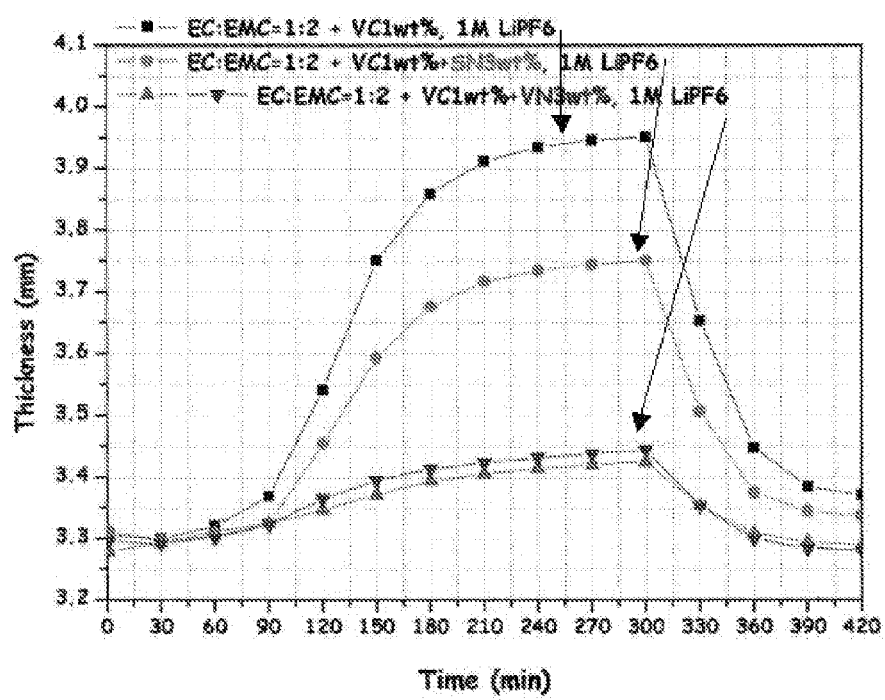

ELECTROCHEMICAL DEVICE COMPRISING ALIPHATIC MONO-NITRILE COMPOUND

This application claims the benefit of the filing date of Korean Patent Application No. 2005-9706, filed on Feb. 2, 2005, in the Korean Intellectual Property Office, the disclosure of which is incorporated herein in its entirety by reference.

TECHNICAL FIELD

The present invention relates to a cathode comprising a complex formed between the surface of a cathode active material and an aliphatic mono-nitrile compound; a non-aqueous electrolyte containing a lithium salt, a solvent and an aliphatic mono-nitrile compound; and an electrochemical device comprising the cathode and/or the electrolyte.

BACKGROUND ART

Recently, as electronic instruments have become wireless and portable, non-aqueous electrolyte-based secondary batteries with high capacity and high energy density are practically used as drive sources for the electronic instruments. However, such non-aqueous electrolyte-based secondary batteries are problematic in that they cause a drop in battery capacity during repeated charge/discharge cycles due to the following reasons (1) to (5), and particularly cause a significant drop in battery capacity under high-temperature conditions:

(1) A transition metal contained in a composite oxide for a cathode may be dissolved into a non-aqueous electrolyte and precipitated on an anode, resulting in structural collapse of the composite oxide, or an increase in the interfacial resistance;

(2) The transition metal dissolved out of the cathode grows continuously to cause a minute short circuit between the cathode and the anode;

(3) The transition metal dissolved out of the cathode and precipitated on the anode may function as a catalyst for accelerating decomposition of the non-aqueous electrolyte, thereby generating gas in the battery;

(4) The SEI (Solid Electrolyte Interface) layer of the anode has an increased film thickness during repeated charge/discharge cycles, and interrupts movement of $Li^+$ ions; and (5) The SEI layer is broken gradually due to the expansion/contraction of an anode active material.

In general, (1) a cathode active material, comprising a lithium-containing metal oxide capable of lithium and/or lithium ion intercalation/deintercalation, reacts with an electrolyte comprising a carbonate solvent and a lithium salt under high-temperature conditions, to increase the resistance in the electrode; and (2) the SEI layer formed on the surface of the anode active material capable of lithium and/or lithium ion intercalation/deintercalation is broken gradually at high temperature due to repeated charge/discharge cycles, so that a poor SEI layer is formed by the carbonate solvent and irreversible reactions (such as Li corrosion) are accelerated. Therefore, a non-aqueous electrolyte-based secondary battery has a problem of a significant drop in the battery quality and efficiency, particularly under high-temperature conditions.

Meanwhile, in the case of a non-aqueous electrolyte-based secondary battery, problems related to safety occur under overcharge conditions due to the following reasons. Cathode active materials, such as a lithium-containing metal oxide, capable of lithium and/or lithium ion intercalation/deintercalation are converted into thermally unstable materials due to the deintercalation of lithium under overcharge conditions. Additionally, the structural collapse of the unstable cathode active material results in an exothermic reaction, and the oxygen liberated from the lithium-containing metal oxide, thereby accelerating the reaction between an electrolyte and a cathode and the combustion reaction of an electrolyte. Such chain reactions accompanied with heat emission finally result in a so-called thermal runaway phenomenon.

Generally, factors affecting the safety of a battery under overcharge conditions include: (1) heat emission due to the oxidation of an electrolyte; and (2) heat emission caused by the structural collapse of a cathode.

When overcharge proceeds, heat emission occurring from the above factors independently or simultaneously causes an increase in the internal temperature of a battery, followed by ignition or explosion of the battery. Thus, batteries show a safety problem upon overcharge.

Meanwhile, ignition and explosion of a battery occur due to the so-called thermal runaway phenomenon, when external physical impact (for example, exposure to high temperature by heating) is applied to the battery while the battery is charged or overcharged, and thus the battery experiences a local short circuit; when a battery is overheated due to the heat emission caused by the reaction of a flammable electrolyte with a cathode active material; and when the oxygen generated from an electrode (particularly, a cathode) accelerates the combustion of an electrolyte.

DISCLOSURE OF THE INVENTION

The present inventors have found that when an aliphatic mono-nitrile compound, such as valeronitrile or butyronitrile, is added to an electrolyte, it is possible to reduce the viscosity of the electrolyte and to improve the ion conductivity of the electrolyte. We have also found that the aliphatic mono-nitrile compound forms a complex with the surface of a cathode active material and forms a protective layer on the cathode, so as to improve the safety of a battery, when the battery is overcharged and/or subjected to physical impacts applied from the exterior of the battery (for example, exposure to high temperature by heating). The present invention is based on these findings.

Further, we have found that when a passivation layer is formed on the surface of an anode by vinylene carbonate, a derivative thereof, or an ether compound, in addition to formation of a protective layer due to the complex formation between the surface of a cathode active material and an aliphatic mono-nitrile compound, it is possible to improve the life characteristics of a battery under high temperature with no degradation in the battery quality, by virtue of the synergic effect derived from stable protective layers present on both electrodes (cathode and anode) during charge/discharge cycles. In addition to the above, it was found that most of problems (e.g. gas generation, resistance increase, capacity drop, battery explosion, breakage, or the like), occurring when a battery is exposed to high temperature over a short or long period, can be solved by preventing the anode/cathode from its structural collapse and by controlling side reactions and an increase in resistance, caused by the reaction between an electrolyte and an electrode active material. The present invention is also based on these findings.

According to an aspect of the present invention, there is provided a cathode comprising a complex formed between the surface of a cathode active material and an aliphatic mono-nitrile compound.

According to another aspect of the present invention, there is provided a non-aqueous electrolyte comprising a lithium salt, a solvent and an aliphatic mono-nitrile compound.

According to still another aspect of the present invention, there is provided a non-aqueous electrolyte, which comprises a lithium salt, a solvent and an aliphatic mono-nitrile compound, and further comprises an additive for electrolyte selected from the group consisting of vinylene carbonate, derivatives thereof, and ether compounds.

According to still another aspect of the present invention, there is provided an electrochemical device comprising the cathode and/or the electrolyte.

According to yet another aspect of the present invention, there is provided an electrochemical device, which comprises: (1) a cathode comprising a complex formed between the surface of a cathode active material and an aliphatic mono-nitrile compound; (2) an anode comprising a passivation layer formed by a compound selected from the group consisting of vinylene carbonate, derivatives thereof and ether compounds; and (3) an electrolyte comprising a lithium salt and a solvent.

Hereinafter, the present invention will be explained in more detail.

The compound capable of forming a complex on the surface of a cathode according to the present invention is an aliphatic mono-nitrile compound. Particular examples of the aliphatic mono-nitrile compound include a compound represented by the following formula 1:

[Formula 1]

wherein R is a C1-C15 alkane.

Aliphatic mono-nitrile compounds can form a strong bond with a transition metal, such as cobalt, contained in the cathode active material through their cyano functional groups having high dipole moment. Particularly, the cyano functional groups can form stronger bonds with the surface of the cathode at high temperature, thereby forming a complex structure (or a ligand) (see, FIG. 1).

The XPS (X-ray photoelectron spectroscopy) data provided in FIG. 1 show formation of a complex through cyano functional groups in an aliphatic mono-nitrile compound, which are bonded with cobalt metal or metal oxide.

If a protective layer is formed on the surface of a cathode by the complex, it is possible to prevent a transition metal contained in the cathode active material from being dissolved into an electrolyte and from being precipitated on an anode during repeated charge/discharge cycles. Also, it is possible to inhibit side reactions occurring between an electrolyte and the cathode, as well as gas generation, so as to allow smooth lithium intercalation/deintercalation even at high temperature. Therefore, it is possible to prevent degradation in life characteristics of a battery. Particularly, because an aliphatic mono-nitrile compound provides a stronger effect of protecting an electrode surface at high temperature rather than room temperature, it is possible to provide a thermally stable electrode.

Additionally, the complex formed on the cathode surface from the compound represented by formula 1 controls heat emission caused by the reaction between an electrolyte and a cathode and by the structural collapse of a cathode, and decreases the calorific value generated from such heat emission. Thus, when a battery is overcharged, experiences an internal short circuit, or is exposed to high temperature, it is possible to prevent combustion of an electrolyte by the oxygen liberated due to the structural collapse of a cathode, generation of thermal runaway, and ignition or explosion of the battery.

In order to simplify a manufacturing process of a battery, it is preferable that an aliphatic mono-nitrile compound is introduced into an electrolyte, and then a complex is formed between the surface of a cathode active material and the aliphatic mono-nitrile compound. However, it is also possible to form a cathode having a complex on the surface thereof preliminarily, before the assemblage of a battery.

Preferably, the complex between the surface of a cathode active material and the aliphatic mono-nitrile compound is formed by dipping a cathode, comprising a cathode active material coated on a collector, into an electrolyte containing the aliphatic mono-nitrile compound added thereto, followed by heat treatment at high temperature. Particularly, the high-temperature heat treatment may be performed in such a temperature range as not to affect electrode active materials and a binder, generally at a temperature of 180° C. or lower. Otherwise, although the high-temperature heat treatment depends on the kind of the aliphatic nitrile compound, it may be performed at such a temperature range as to prevent excessive evaporation of the aliphatic nitrile compound, generally at a temperature of 100° C. or lower. In general, the high-temperature treatment is suitably performed at a temperature between 60° C. and 90° C. Long-term treatment at a temperature between 30° C. and 40° C. may provide the same effect.

Meanwhile, the aliphatic mono-nitrile compound (formula 1) protects the surface of a cathode in the same manner as an aliphatic dinitrile compound represented by the following formula 2. However, when the aliphatic mono-nitrile compound is added to an electrolyte, it decreases viscosity of the electrolyte to a higher degree compared to the aliphatic dinitrile compound, so as to accomplish conduction of $Li^+$ with high efficiency, and it serves to reduce the interfacial resistance in a battery. Additionally, even when a battery is exposed to extreme conditions (e.g. a low temperature of −10° C. or less, or a high temperature of 90° C. or higher), the aliphatic mono-nitrile compound can control side reactions more efficiently (see Table 1, FIGS. 7 and 8).

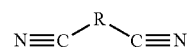
[Formula 2]

The following Table 1 shows ion conductivity and viscosity of an electrolyte containing a carbonate solvent, 1M $LiPF_6$ salt and 1 wt % of VC, to which VN (valeronitrile) is further added or not.

TABLE 1

| EC:EMC = 1:2, 1M LiPF6 Ionic conductivity | VC1 wt % | VC1 wt % + VN5 wt % | (Unit: mS/cm) VC1 wt % + VN10 wt % |
|---|---|---|---|
| 23° C. | 8.65 | 8.7 | 8.993 |
| 0° C. | 4.441 | 4.445 | 4.784 |
| -10° C. | 2.861 | 2.9 | 3.007 |
| EC:EMC = 1:2, 1M LiPF6 Viscosity | VC1 wt % | VC1 wt % + VN5 wt % | (Unit: centipoise) VC1 wt % + VN10 wt % |
| 23° C. | 0.351 | 0.3245 | 0.27705 |
| 0° C. | 0.68607 | 0.6148 | 0.50458 |

The following Table 2 shows ion conductivity and viscosity of an electrolyte containing a carbonate solvent, 1M $LiPF_6$ salt and 1 wt % of VC, to which BN (butyronitrile) is further added, or is not.

TABLE 2

| EC:EMC =1:2, 1M LiPF6 Ionic conductivity | VC1 wt % | (Unit: mS/cm) VC1 wt % + BN5 wt % |
|---|---|---|
| 23° C. | 8.65 | 9.171 |
| 0° C. | 4.441 | 4.823 |
| -10° C. | 2.861 | 3.273 |

| EC:EMC = 1:2, 1M LiPF6 Viscosity | VC1 wt % | (Unit: centipoise) VC1 wt % + BN5 wt % |
|---|---|---|
| 23° C. | 0.351 | 0.30457 |
| 0° C. | 0.68607 | 0.59003 |

As can be seen from the above Tables 1 and 2, BN has excellent ion conductivity and viscosity compared to VN, and thus can improve the quality of a battery at low temperature.

Meanwhile, alkanes present in the compound represented by formula 1 have no reactivity. Therefore, when the compound represented by formula 1 is incorporated, a possibility of an irreversible reaction is low. As a result, addition of the compound represented by formula 1 does not cause degradation in the quality of a battery.

The maximum amount of the aliphatic mono-nitrile compound depends on the solubility of the compound to the solvent used in the corresponding non-aqueous electrolyte. In general, addition of the aliphatic mono-nitrile compound in an excessively large amount may cause a problem of degradation in the quality of a battery. Thus, the aliphatic mono-nitrile compound is used preferably in an amount of up to 20 wt % based on 100 wt % of the electrolyte. The minimum amount of the aliphatic mono-nitrile compound depends on the desired degree of improvement in the safety. Preferably, the aliphatic mono-nitrile compound is in an amount of at least 0.1 wt % based on 100 wt % of the electrolyte.

The compound capable of forming a passivation layer on an anode according to the present invention, is selected from the group consisting of vinylene carbonate represented by formula 3, derivatives thereof and ether compounds:

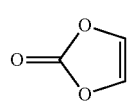

[Formula 3]

The derivatives of the compound (VC) represented by formula 3 include those having a non-polar side chain (e.g. C1~C5 alkyl group) bonded to the ring structure in formula 3.

Particular examples of the ether compound include benzyl methyl ether (formula 4) and tetraethylene glycol dimethyl ether (formula 5):

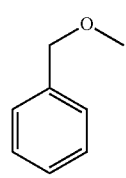

[Formula 4]

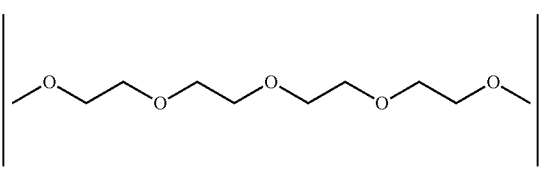

[Formula 5]

An ether compound can provide the same effect as vinylene carbonate (VC) by forming a passivation layer on an anode, like VC. Therefore, combination of an ether compound with an aliphatic mono-nitrile compound can provide a synergic effect (see Table 3).

The following Table 3 shows the quality of a battery, which uses an ether compound as an electrolyte additive for carrying out passivation of an anode.

TABLE 3

| 323456 size Full cell test | | | |
|---|---|---|---|
| EC:PC:DEC = 3:2:5, 1M LiPF6 Additive (%) | Capacity 0.5 C./0.2 C. (mAh) | 0.5 C. charge 0.5 C./ 1.0 C./1.5 C. discharge (%) | Cycle life |
| VC (0.5 w %) | 586 | 100/99.2/97.3 | Good |
| BME (0.5 w %) | 588 | 100/99.0/97.0 | Good |
| TGDE (0.5 w %) | 586 | 100/98.9/96.9 | Good |

The protective layer formed on the surface of an anode by a carbonate solvent is porous and is not dense, and thus increases irreversible reactions during repeated charge/discharge cycles and causes Li loss and formation of dendrite, resulting in significant degradation in the quality of a battery.

On the contrary, the compound that performs passivation of an anode, such as vinylene carbonate, a derivative thereof or an ether compound, forms a dense and close protective layer upon the initial charge cycle (which is generally referred as formation of battery). The protective layer prevents co-intercalation of the carbonate solvent into the layered structure of active materials and decomposition of the carbonate solvent, and thus reduces irreversible reactions in a battery. Additionally, the protective layer allows only $Li^+$ to be intercalated/deintercalated through the layer, and thus improves life characteristics of a battery (see FIG. 2). However, it was found that the passivation layer (SEI layer) formed by the above compounds is broken gradually according to the expansion/contraction of active materials during repeated charge/discharge cycles at high temperature. Hence, a poor SEI layer is formed at such broken regions by the carbonate solvent, and accelerates irreversible reactions such as Li corrosion, resulting in significant degradation in the cycle characteristics of a battery with time. Therefore, it can be seen that passivation of an anode alone cannot improve the life characteristics.

Meanwhile, when only a cathode is passivated by an aliphatic mono-nitrile compound, the cathode surface can be stabilized due to the interconnection between the aliphatic mono-nitrile compound and the cathode. However, in this case, there is a problem in that a poor SEI layer formed by a carbonate solvent interrupts smooth conduction of $Li^+$ ions, and causes an electrochemical imbalance in a battery and precipitation of Li metal on the anode surface, resulting in significant degradation in life characteristics of a battery at room temperature and high temperature.

Finally, it can be seen that protection of either of a cathode and an anode cannot serve to maintain high-temperature life characteristics of a battery. Therefore, the present invention provides a secondary battery, whose cathode as well as anode is protected via passivation in order to improve high-temperature life characteristics of a battery.

To simplify a manufacturing process of a battery, it is preferable to introduce additives into an electrolyte, each additive functioning as a passivation agent for each electrode. However, it is also possible to prepare a passivated cathode and a passivated anode, separately, before the assemblage of a battery.

In order to obtain a synergic effect, an anode should be protected by a protective layer formed by a compound capable of forming a dense and strong SEI layer, while a cathode should be protected by an aliphatic mono-nitrile additive that can prevent dissolution of a transition metal and can form a strong complex with a transition metal or a metal oxide.

Meanwhile, an aromatic nitrile compound is reduced and decomposed earlier than VC, thereby forming a poor SEI layer that interrupts formation of a dense and close protective layer. However, an aliphatic mono-nitrile compound does not cause the aforementioned problem.

When a compound capable of passivation of an anode, such as vinylene carbonate (VC), a derivative thereof or an ether compound, is used as an additive for electrolyte, the maximum amount of the compound is determined regardless of the kind of the solvent used in the non-aqueous electrolyte. However, because addition of an excessive amount of the above compound causes generation of gas at high temperature, resulting in swelling of a battery, it is preferable to use the above compound in an amount of up to 5 wt % based on 100 wt % of the electrolyte. The minimum amount of the above compound depends on the desired degree of improvement in the high-temperature life characteristics of a battery. However, it is preferable to use the above compound in an amount of at least 0.1 wt %.

Non-aqueous electrolytes for lithium secondary batteries generally include flammable non-aqueous organic solvents including cyclic carbonates, linear carbonates and combinations thereof. Particular examples of cyclic carbonates that may be used in the present invention include ethylene carbonate (EC), propylene carbonate (PC), gamma-butyrolactone (GBL), or the like. Typical examples of linear carbonates include diethyl carbonate (DEC), dimethyl carbonate (DMC), ethylmethyl carbonate (EMC), or the like.

Non-aqueous electrolytes comprise lithium salts such as $LiClO_4$, $LiCF_3SO_3$, $LiPF_6$, $LiBF_4$, $LiAsF_6$, $LiN(CF_3SO_2)_2$, or the like.

Typical examples of an electrochemical device that can be manufactured according to the present invention include a lithium secondary battery, and the lithium secondary battery may comprise:
  (1) a cathode capable of lithium ion intercalation/deintercalation;
  (2) an anode capable of lithium ion intercalation/deintercalation;
  (3) a porous separator; and
  (4) a) a lithium salt; and
     b) a solvent for electrolyte.

As a cathode active material for use in a lithium secondary battery, lithium-containing transition metal oxides may be used. The cathode active material can be at least one material selected from the group consisting of $LiCoO_2$, $LiNiO_2$, $LiMn_2O_4$, $LiMnO_2$ and $LiNi_{1-x}Co_xO_2$ (wherein $0<X<1$). Meanwhile, as an anode active material for use a lithium secondary battery, carbon, lithium metal or lithium alloy may be used. In addition, other metal oxides capable of lithium intercalation/deintercalation and having an electric potential of less than 2V based on lithium (for example, $TiO_2$ and $SnO_2$) may be used as an anode active material.

The lithium secondary battery according to the present invention may have a cylindrical, prismatic or pouch-like shape.

BRIEF DESCRIPTION OF THE DRAWINGS

FIG. 7 is a graph showing the low-temperature (−10° C.) quality of the battery according to Example 3 and the battery according to Comparative Example 4, which further comprise VN and SN, respectively, added to an electrolyte containing a carbonate solvent, 1M $LiPF_6$ salt and 1 wt % of VC; and FIG. 8 is a graph showing variations in the thickness of the battery according to Comparative Example 3, the battery according to Example 3 and the battery according to Comparative Example 4, which further comprise 1 wt % of VC (Comparative Example 3), 1 wt % of VC as well as 3 wt % of VN (Example 3), and 1 wt % of VC as well as 3 wt % of SN (Comparative Example 4), respectively, added to an electrolyte containing a carbonate solvent and 1M $LiPF_6$ salt, upon exposure to a high temperature of 90° C.

BEST MODE FOR CARRYING OUT THE INVENTION

Reference will now be made in detail to the preferred embodiments of the present invention. It is to be understood that the following examples are illustrative only and the present invention is not limited thereto.

EXAMPLES

Example 1

The electrolyte used in this example was 1M $LiPF_6$ solution containing EC:PC:DEC=3:2:5. To the electrolyte, 1 wt % of VC, and 3~5 wt % of valeronitrile were added. Artificial graphite and $LiCoO_2$ were used as an anode active material and a cathode active material, respectively. Then, a 3456-sized lithium polymer battery was manufactured by using a conventional method and the battery was packed with an aluminum laminate pouch to provide a battery pack.

Example 2

The electrolyte used in this example was 1M $LiPF_6$ solution containing EC:EMC=1:2. To the electrolyte, 1 wt % of VC, and 3~5 wt % of valeronitrile were added. Artificial graphite and $LiCoO_2$ were used as an anode active material and a cathode active material, respectively. Then, a 3456-sized lithium polymer battery was manufactured by using a conventional method and the battery was packed with an aluminum laminate pouch to provide a battery pack.

Example 3

Example 2 was repeated to provide a lithium polymer battery, except that propionitrile was used instead of valeronitrile.

Comparative Example 1

Example 1 was repeated to provide a lithium polymer battery, except that neither valeronitrile nor VC was added to the electrolyte.

Comparative Example 2

Example 1 was repeated to provide a lithium polymer battery, except that valeronitrile was not added to the electrolyte.

Comparative Example 3

Example 2 was repeated to provide a lithium polymer battery, except that valeronitrile was not added to the electrolyte.

Comparative Example 4

Example 2 was repeated to provide a lithium polymer battery, except that 3 wt % of succinonitrile was added to the electrolyte instead of valeronitrile.

The batteries obtained from the above Examples 1 to 3 and Comparative Examples 1 to 4 were subjected to heat treatment at 60° C. for 12 hours or more, or at 30° C. for a longer period.

[Experimental Results]

1. Test for Formation of Ligands on Cathode Surface

Figure 1:
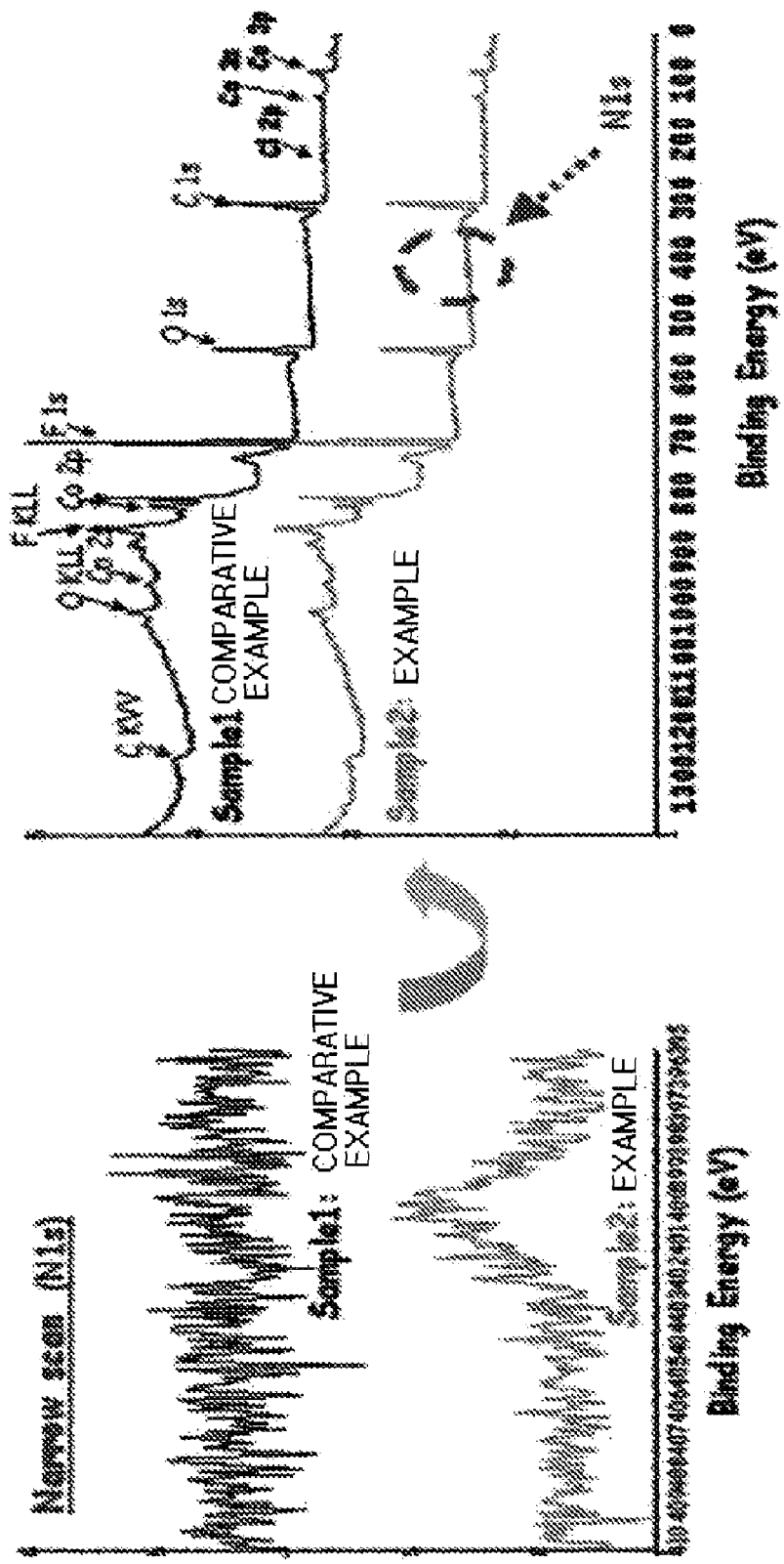
FIG. 1 is a XPS (X-ray photoelectron spectroscopy) graph showing the formation of a complex between the surface of a cathode and valeronitrile (VN) as an aliphatic mono-nitrile compound, when using VN as an additive for electrolyte.

Each battery obtained from Example 1 and Comparative Examples 1 and 2 was fully charged to 4.2V and each cathode was separated from each battery to prepare a sample of 1 cm×1 cm size. Additionally, each sample was cleaned with dimethyl carbonate (DMC) to remove impurities remaining on the surface and then was tested to check the formation of ligands by using a general surface analyzing apparatus based on XPS (X-ray photoelectron spectroscopy). The XPS apparatus (ESCALAB 250) used in this test is one that shows constitutional elements forming a surface by detecting specific binding energy and kinetic energy of atoms and by reading atomic information to the depth of several nanometers from the surface. Complex formation for the electrode comprising a nitrile compound was checked through a peak corresponding to the formation of nitrogen atoms. As shown in FIG. 1, nitrogen atoms were not detected on the surface of the cathode in the batteries (Comparative Examples 1 and 2) using no valeronitrile. On the other hand, in the case of the battery (Example 1) using valeronitrile, nitrogen atoms were clearly detected by the presence of a strong bond (ligand) formed between valeronitrile and cobalt transition metal or a metal oxide in the cathode.

It could be expected from the above results that an aliphatic nitrile additive could form a strong complex with the surface of a cathode active material, thereby inhibiting side reactions generated in the battery during repeated charge/discharge cycles.

2. Test for Determination of SEI Layer Formation on Anode Surface

Figure 2:
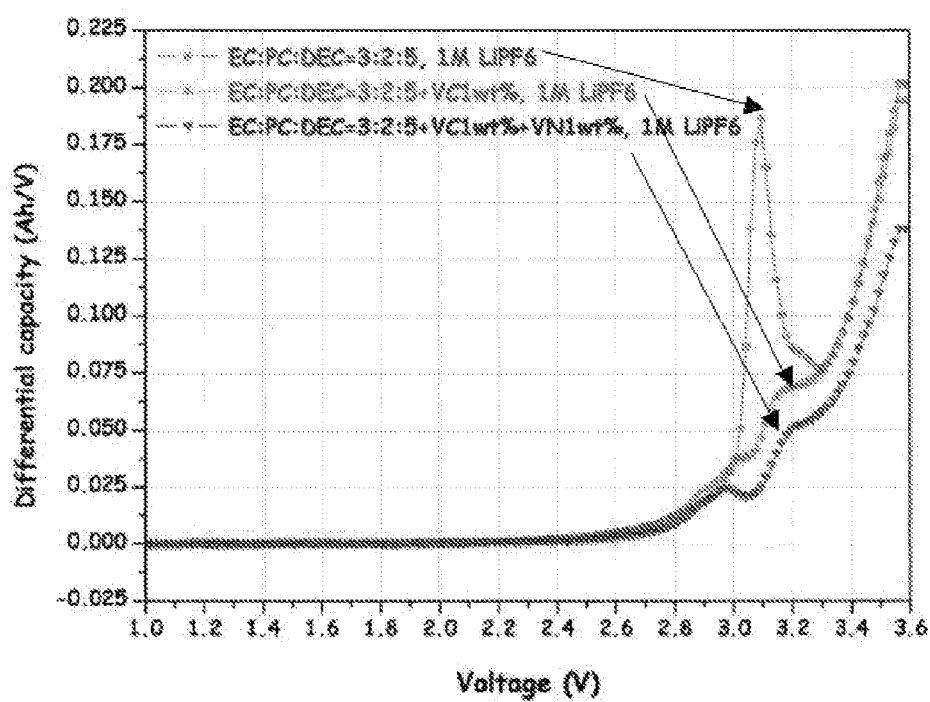
FIG. 2 is a graph showing the data of capacity differentiated by voltage, which indicate irreversible reactions and reactivity with an anode depending on the presence of vinylene carbonate (VC) additive during the initial charge cycle.

Each of the batteries according to Example 1 and Comparative Examples 1 and 2 was charged at a current of 0.2 C for 50 minutes in a constant current manner to perform formation of an SEI layer. A graph showing the capacity of the initial charge cycle, differentiated by the voltage, was plotted in order to check whether the SEI layer was formed on the anode comprising artificial graphite by the decomposition of the carbonate solvent. As shown in FIG. 2, the peaks appearing in the graph indicate the irreversible reaction caused by the decomposition of the carbonate solvent, i.e. the reaction accompanied with consumption of lithium upon the formation of the SEI layer. The battery using the electrolyte comprising VC showed no peaks caused by a reaction accompanied with consumption of lithium, which indicates that passivation layers are formed from VC on the anode surface (Example 1 and Comparative Example 2).

3. Test for High-Temperature Safety and Heat Emission Control of Cathode Upon Ligand Formation Each battery obtained from Examples 2 and 3 and Comparative Example 3 was charged to 4.2V. A general thermogravimetric analyzer, DSC (Differential Scanning Calorimeter) was used, wherein two high-pressure pans resistant to vapor pressure of the electrolyte were used as pans for measurement. To one pan, about 5-10 mg of the cathode sample separated from each of the batteries according to Examples 2 and 3 and Comparative Example 3 was introduced, while the other pan was left empty. Calorific difference between two pans was analyzed while the pans were heated at a rate of 5° C./min to 400° C. to measure temperature peaks corresponding to heat emission.

Figure 3:
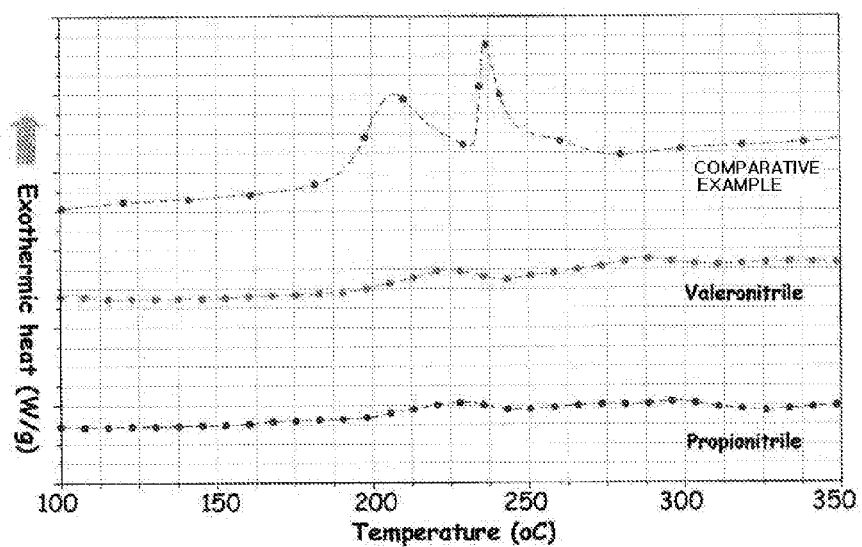
FIG. 3 is a graph showing heat emission peaks observed by DSC (differential scanning calorimetry), which indicate thermal safety of a battery comprising an aliphatic mono-nitrile compound added thereto, and that of a battery comprising no aliphatic mono-nitrile compound.

As shown in FIG. 3, the battery (Comparative Example 3) using the electrode comprising no aliphatic nitrile compound shows heat emission peaks at about 200° C. and 240° C. The peak at about 200° C. indicates heat emission caused by the reaction between the electrolyte and the cathode, while the peak at about 240° C. indicates heat emission caused by combined factors including the reaction between the electrolyte and the cathode, and the structural collapse of the cathode. On the contrary, each of the batteries using the non-aqueous electrolyte comprising valeronitrile and propionitrile according to Examples 2 and 3, respectively, does not show the above two temperature peaks. This indicates that it is possible to inhibit heat emission caused by the reaction between the electrolyte and the cathode, due to the formation of a protective layer through a strong bond between valeronitrile/propionitrile and the cathode surface.

4. Test for High-Temperature Life Characteristics

Each of the batteries according to Example 1 (whose cathode as well as anode was passivated), Comparative Example 1 (neither cathode nor anode was passivated), and Comparative Example 2 (whose anode alone was passivated) was subjected to charge/discharge cycles in a hot chamber at 45° C. at a constant current (1C/1C).

Figure 4:
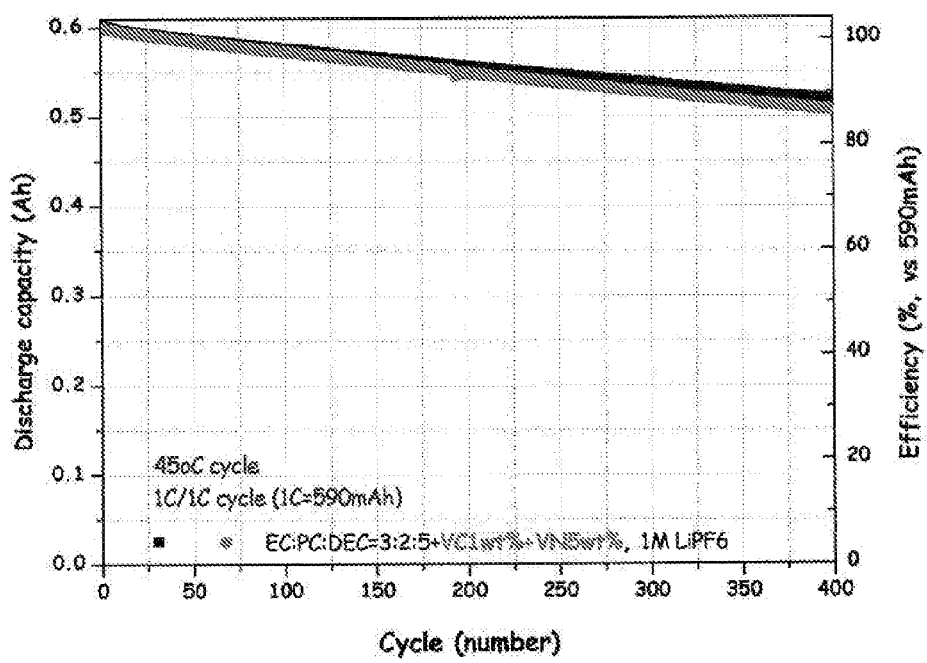
FIG. 4 is a graph showing cycle characteristics of a battery (Example 1) at 45° C., the battery further comprising VC and VN added to an electrolyte containing a carbonate solvent and 1M $LiPF_6$ salt.
Figure 5:
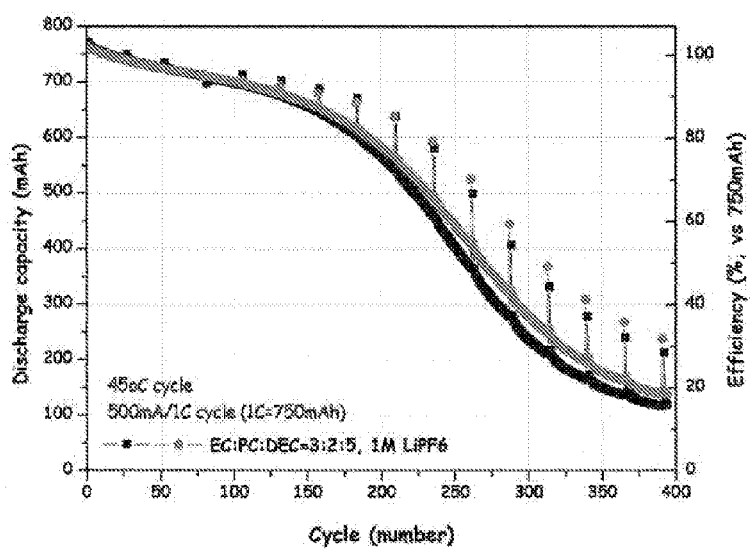
FIG. 5 is a graph showing cycle characteristics of a battery (Comparative Example 1) at 45° C., the battery comprising an electrolyte containing a carbonate solvent and 1M $LiPF_6$ salt.
Figure 6:
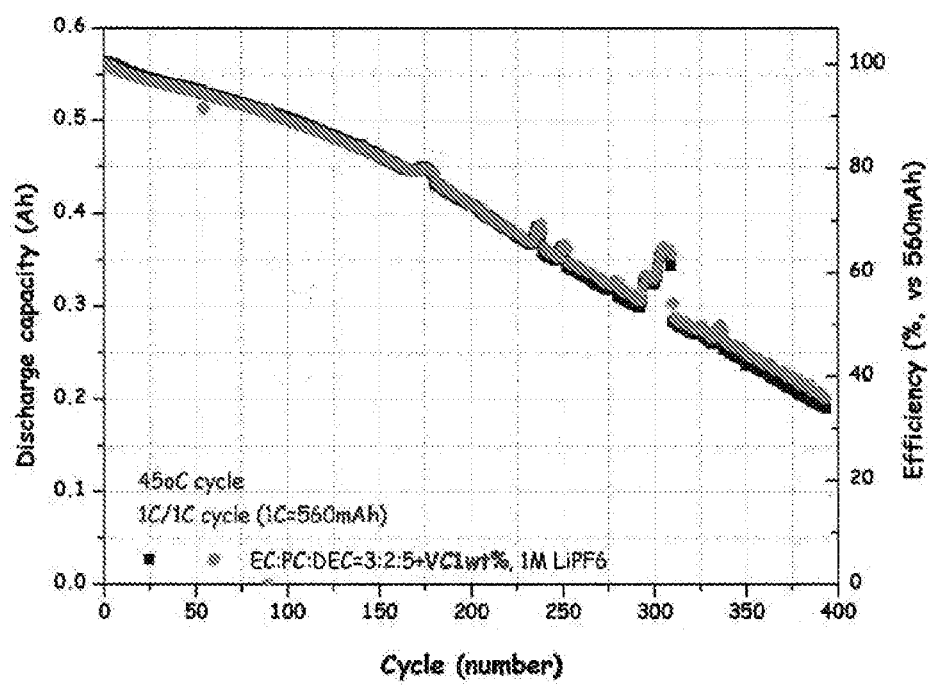
FIG. 6 is a graph showing cycle characteristics of a battery (Comparative Example 2) at 45° C., the battery further comprising VC added to an electrolyte containing a carbonate solvent and 1M $LiPF_6$ salt.

As shown in FIGS. 4, 5 and 6, the battery, whose cathode as well as anode is masked with a protective layer, shows high-temperature life characteristics, which is significantly improved, as compared to the battery, in which either of the cathode and the anode is passivated.

When comparing the life characteristics of the battery according to Example 1 with those of the battery according to Comparative Example 2, the battery according to Comparative Example 2 shows a significant drop in the discharge capacity during repeated charge/discharge cycles. On the contrary, the battery according to Example 1 maintains excellent life characteristics.

5. Test for Battery Quality at Low Temperature

Each of the batteries according to Example 3 (valeronitrile) and Comparative Example 4 (succinonitrile) was charged at the condition of 0.5 C to 4.2V in a constant current/constant voltage (CC/CV) manner and was cut-off at a current of 50 mA. Then, each battery was discharged in a constant current (CC) manner at a low temperature of −10° C. under 1 C to 3V.

FIG. 7 shows the results of the low-temperature quality (−10° C.) of each of the batteries according to Example 3 (valeronitrile) and Comparative Example 4 (succinonitrile).

As can be seen from FIG. 7, the discharge capacity of the battery using valeronitrile with a relatively low melting point (−96° C.) is significantly improved compared to that of the battery using succinonitrile with a relatively high melting point (54~56° C.). Additionally, the electrolyte containing valeronitrile added thereto shows improved ion conductivity and low viscosity, and thus provides a battery with improved low-temperature quality, as compared to a battery using the electrolyte containing no valeronitrile.

6. Hot Box Test

Each of the batteries obtained from Example 1 (valeronitrile), Comparative Example 3 and Comparative Example (succinonitrile) was fully charged. The charged batteries were introduced into an oven capable of convection, heated from room temperature gradually to 90° C. for 1 hour, and exposed to the temperature for 4 hours. Then, each battery was cooled to room temperature and was measured for variations in the thickness of each battery for 420 minutes to determine thermal safety of the battery. The results are shown in FIG. 8.

INDUSTRIAL APPLICABILITY

As can be seen from the foregoing, the non-aqueous electrolyte comprising an aliphatic mono-nitrile compound (formula 1) according to the present invention shows decreased viscosity and improved ion conductivity. Also, according to the battery using the above electrolyte, it is possible to inhibit side reactions even under extreme conditions (a low temperature of −10° C. or lower, or a high temperature of 90° C. or higher).

Additionally, the electrochemical device according to the present invention, which comprises a cathode having a protective layer comprising a complex formed between the cathode surface and an aliphatic mono-nitrile compound, can inhibit heat emission caused by the reaction of an electrolyte with a cathode upon the heating of a battery and by the structural collapse of a cathode, and can reduce the calorific value due to the heat emission. Therefore, it is possible to prevent a battery from being fired due to the generation of an internal short circuit caused by excessive heat emission upon overcharge.

Further, the electrochemical device according to the present invention, which comprises an anode having a passivation layer, formed by VC, a derivative thereof, or an ether compound, on the surface thereof; and a cathode having a protective layer comprising a complex formed between the cathode active material surface and an aliphatic mono-nitrile compound, can prevent degradation in the quality (e.g. capacity drop and swelling due to gas generation), caused by side reactions between an electrolyte and a cathode and by the structural collapse of the anode protective layer at high temperature (over 45° C.). Also, it is possible to prevent a battery from igniting and exploding due to an increase in the internal temperature of the battery, caused by the heat emission during such side reactions. Further, the synergic effect derived from the passivation layer of the anode and the protective layer of the cathode can improve the life characteristics of a battery, while maintaining high capacity and high efficiency, and can provide a battery with excellent safety at high temperature.

The invention claimed is:

1. A method of forming a cathode, the method comprising:
   disposing an electrolyte comprising an aliphatic mono-nitrile compound on a cathode active material;
   heat treating the cathode active material at a temperature of greater than or equal to 30° C. to form an aliphatic mono-nitrile compound-cathode active material complex on a surface of the cathode active material; and then
   charging a lithium secondary battery including the aliphatic mono-nitrile compound-cathode active material complex to form the cathode, wherein a protective layer of the aliphatic mono-nitrile compound is bonded to the cathode active material by a ligand-metal bond formed between a transition metal of the cathode active material and the aliphatic mono-nitrile compound.

2. The method according to claim 1, wherein the aliphatic mono-nitrile compound is a compound represented by the following Formula 1:

$$R\!-\!C\!\equiv\!N \qquad \text{Formula 1}$$

wherein R is a C1-C15 alkyl group.

3. The method according to claim 1, wherein the electrolyte further comprises an additive selected from the group consisting of vinylene carbonate, benzyl methyl ether, and tetramethylene glycol dimethyl ether.

4. The method according to claim 3, wherein the additive is present in the electrolyte in an amount of 0.1 weight percent to 5 weight percent, based on the total weight of the electrolyte.

5. The method according to claim 1, wherein the electrolyte further comprises at least one solvent selected from the group consisting of ethylene carbonate, propylene carbonate, gamma-butyrolactone, diethyl carbonate, dimethyl carbonate, ethyl methyl carbonate and methyl propyl carbonate.

6. The method according to claim 1, wherein the aliphatic mono-nitrile compound is present in the electrolyte in an amount of 0.1 weight percent to 20 weight percent, based on the total weight of the electrolyte.

7. A method of manufacturing an electrochemical device, the method comprising:
   disposing an electrolyte comprising an aliphatic mono-nitrile compound on a cathode comprising a cathode active material;
   heat treating the cathode at a temperature of greater than or equal to 30° C. to form an aliphatic mono-nitrile compound-cathode active material complex on a surface of the cathode active material;
   disposing the cathode, an anode, and an electrolyte comprising a lithium salt and a solvent to form a lithium secondary battery; and then
   charging the lithium secondary battery to manufacture the electrochemical device, wherein a protective layer of the aliphatic mono-nitrile compound is bonded to the cathode active material by a ligand-metal bond formed between a transition metal of the cathode active material and the aliphatic mono-nitrile compound.

8. The method according to claim 7, wherein the aliphatic mono-nitrile compound is a compound represented by the following Formula 1:

     Formula 1 wherein R is a C1-C15 alkyl group.

9. The method according to claim 7, wherein the electrolyte further comprises an additive selected from the group consisting of vinylene carbonate, benzyl methyl ether, and tetramethylene glycol dimethyl ether.

10. The method according to claim 9, wherein the additive is present in the electrolyte in an amount of 0.1 weight percent to 5 weight percent, based on the total weight of the electrolyte.

11. The method according to claim 7, wherein the electrolyte further comprises at least one solvent selected from the group consisting of ethylene carbonate, propylene carbonate, gamma-butyrolactone, diethyl carbonate, dimethyl carbonate, ethyl methyl carbonate and methyl propyl carbonate.

12. The method according to claim 7, wherein the aliphatic mono-nitrile compound is present in the electrolyte in an amount of 0.1 weight percent to 20 weight percent, based on the total weight of the electrolyte.

* * * * *